United States Patent
Park

(10) Patent No.: US 10,455,360 B2
(45) Date of Patent: *Oct. 22, 2019

(54) REAL-TIME PATH SUGGESTION FOR A LOCATION-ENABLED MOBILE DEVICE

(71) Applicant: QUALCOMM Incorporated, San Diego, CA (US)

(72) Inventor: Young Shin Park, San Mateo, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/177,091

(22) Filed: Oct. 31, 2018

(65) Prior Publication Data

US 2019/0069134 A1 Feb. 28, 2019

Related U.S. Application Data

(63) Continuation of application No. 13/800,937, filed on Mar. 13, 2013.

(60) Provisional application No. 61/717,309, filed on Oct. 23, 2012.

(51) Int. Cl.
*H04W 4/02* (2018.01)
*G01C 21/20* (2006.01)

(52) U.S. Cl.
CPC .......... *H04W 4/025* (2013.01); *G01C 21/206* (2013.01)

(58) Field of Classification Search
CPC ....... H04W 4/02; H04W 4/026; H04W 4/023; H04W 4/20; G06Q 10/10
See application file for complete search history.

(56) References Cited

U.S. PATENT DOCUMENTS

| | | | |
|---|---|---|---|
| 5,875,412 A | 2/1999 | Sulich et al. | |
| 6,430,498 B1 | 8/2002 | Maruyama et al. | |
| 2004/0051644 A1 | 3/2004 | Tamayama et al. | |
| 2004/0246147 A1 | 12/2004 | Von Grabe | |
| 2008/0275699 A1 | 11/2008 | Mozer | |
| 2009/0315766 A1 | 12/2009 | Khosravy et al. | |
| 2009/0318168 A1* | 12/2009 | Khosravy .......... | G06Q 30/0241 455/456.3 |
| 2010/0248745 A1 | 9/2010 | Ozawa et al. | |

(Continued)

FOREIGN PATENT DOCUMENTS

| | | |
|---|---|---|
| EP | 0524814 A2 | 1/1993 |
| EP | 1241446 A2 | 9/2002 |

(Continued)

OTHER PUBLICATIONS

International Search Report and Written Opinion—PCT/US2013/066079—ISA/EPO—dated Feb. 4, 2014.

*Primary Examiner* — Lester G Kincaid
*Assistant Examiner* — Dung Lam
(74) *Attorney, Agent, or Firm* — Muncy, Geissler, Olds & Lowe, P.C.

(57) ABSTRACT

The disclosure is directed to navigating based on directionality. An embodiment determines a position and a direction of a mobile device, determines one or more paths from the mobile device to one or more destinations associated with a current location of the mobile device, and displays one or more direction indicators corresponding to the one or more paths to the one or more destinations.

30 Claims, 4 Drawing Sheets

(56) References Cited

U.S. PATENT DOCUMENTS

| | | | |
|---|---|---|---|
| 2010/0268463 A1* | 10/2010 | Kurtti | G01C 21/3679 |
| | | | 701/469 |
| 2011/0047509 A1 | 2/2011 | Arrasvuori | |
| 2011/0081919 A1 | 4/2011 | Das et al. | |
| 2011/0106430 A1 | 5/2011 | Schirmer et al. | |
| 2012/0105202 A1 | 5/2012 | Gits et al. | |
| 2013/0093787 A1* | 4/2013 | Fulks | G06T 11/60 |
| | | | 345/629 |
| 2013/0325481 A1 | 12/2013 | Van et al. | |
| 2014/0113660 A1 | 4/2014 | Park | |

FOREIGN PATENT DOCUMENTS

| | | |
|---|---|---|
| EP | 2154482 A1 | 2/2010 |
| JP | H0534167 A | 2/1993 |
| JP | 2005301196 A | 10/2005 |
| JP | 2010197588 A | 9/2010 |

\* cited by examiner

REAL-TIME PATH SUGGESTION FOR A LOCATION-ENABLED MOBILE DEVICE

CLAIM OF PRIORITY UNDER 35 U.S.C. § 119

The present Application for Patent is a continuation of U.S. application Ser. No. 13/800,937, entitled "REAL-TIME PATH SUGGESTION FOR A LOCATION-ENABLED MOBILE DEVICE," filed Mar. 13, 2013, which claims the benefit of U.S. Provisional Application No. 61/717,309, entitled "REAL-TIME PATH SUGGESTION FOR A LOCATION-ENABLED MOBILE DEVICE," filed Oct. 23, 2012, assigned to the assignee hereof, and expressly incorporated herein by reference in their entirety.

BACKGROUND OF THE INVENTION

1. Field of the Invention

The disclosure is directed to real-time path suggestion for a location-enabled mobile device.

2. Description of the Related Art

Modern cell phones, such as smart phones, are typically capable of determining their position within a certain degree of accuracy. When available, cell phones generally rely on global positioning system (GPS) signals. When GPS is not available, such as when the cell phone is indoors, the cell phone can use local positioning system (LPS) signals. In an LPS, the cell phone receives radio signals from at least three local transmitters, such as Wi-Fi transmitters, to triangulate its position. The cell phone may augment this position with an internal inertial navigation system (INS). An INS uses the cell phone's accelerometers (motion) and gyroscopes (rotation) to continuously calculate the cell phone's position, orientation, and velocity via dead reckoning.

A cell phone may also execute a navigation application that guides a user from the current location of the cell phone to an identified destination. The navigation application uses the continuously determined position of the cell phone and a map of the area in which the cell phone is located to provide the user with turn-by-turn directions to the destination. The cell phone may display the entire route or just the area immediately around the cell phone's current position.

Since the display screen of a cell phone is small, the map from the cell phone's current position to the destination is often too small to read in detail, and the user must zoom-in to see the next path to follow. If a routable path to the destination is not available, the user needs to zoom-out to see the destination and try to determine a route visually.

In some situations, it may be difficult and/or inconvenient for the user to continuously zoom-in and out on the map. Additionally or alternatively, the user may not want to take the time to enter a destination, or, even if the user enters a destination, turn-by-turn directions may not be available. For example, a user may have his or her hands full of luggage while trying to find a particular gate at an airport, and even if the user took the time to select that particular gate as a destination, turn-by-turn directions may not be available.

Accordingly, it would be beneficial if the cell phone could provide real-time direction indicators to nearby destinations and/or points of interest (POIs) at a given location, such as an airport, amusement park, shopping mall, theater, athletic stadium, office building, etc., as the user moves through the location.

SUMMARY

The disclosure is directed to navigating based on directionality. A method for navigating based on directionality includes determining a position and a direction of a mobile device, determining one or more paths from the mobile device to one or more destinations associated with a current location of the mobile device, and displaying one or more direction indicators corresponding to the one or more paths to the one or more destinations.

An apparatus for navigating based on directionality includes logic configured to determine a position and a direction of a mobile device, logic configured to determine one or more paths from the mobile device to one or more destinations associated with a current location of the mobile device, and logic configured to display one or more direction indicators corresponding to the one or more paths to the one or more destinations.

An apparatus for navigating based on directionality includes means for determining a position and a direction of a mobile device, means for determining one or more paths from the mobile device to one or more destinations associated with a current location of the mobile device, and means for displaying one or more direction indicators corresponding to the one or more paths to the one or more destinations.

A non-transitory computer-readable medium for navigating based on directionality includes at least one instruction to determine a position and a direction of a mobile device, at least one instruction to determine one or more paths from the mobile device to one or more destinations associated with a current location of the mobile device, and at least one instruction to display one or more direction indicators corresponding to the one or more paths to the one or more destinations.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
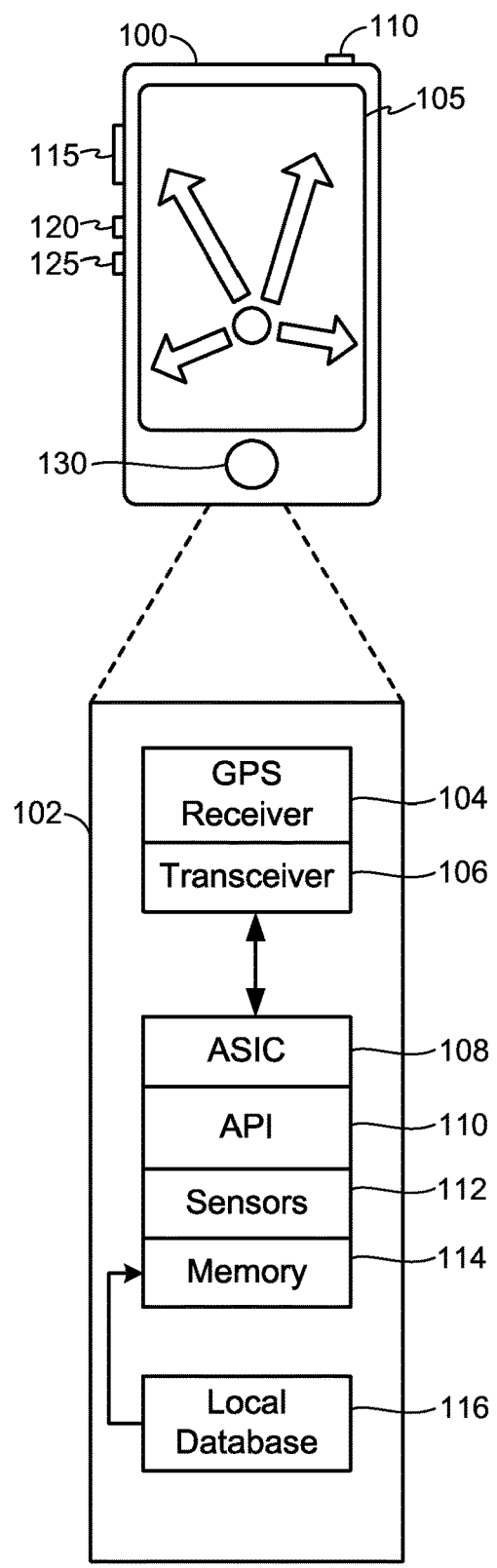
FIG. 1 illustrates an example of a user equipment (UE) according to an embodiment.

Aspects of the invention are disclosed in the following description and related drawings directed to specific embodiments. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates an example of a UE according to an embodiment. Referring to FIG. 1, UE 100 is illustrated as a touchscreen device (e.g., a smart phone, a tablet computer, etc.). As shown in FIG. 1, an external casing of UE 100 is configured with a touchscreen display 105, peripheral buttons 110, 115, 120 and 125 (e.g., a power control button, a volume or vibrate control button, an airplane mode toggle button, etc.), at least one front-panel button 130 (e.g., a Home button, etc.), various sensors, a speaker, and microphone (not shown), among other components, as is known in the art. While not shown explicitly as part of UE 100, the UE 100 can include one or more external antennas and/or one or more integrated antennas that are built into the external casing of UE 100, including but not limited to WiFi antennas, cellular antennas, satellite position system (SPS) antennas (e.g., global positioning system (GPS) antennas), and so on.

While internal components of UEs such as the UE 100 can be embodied with different hardware configurations, a basic high-level UE configuration for internal hardware components is shown as platform 102 in FIG. 1. The platform 102 can receive and execute software applications, data and/or commands transmitted from a radio access network (RAN) that may ultimately come from a core cellular network, the Internet, and/or other remote servers and/or networks (e.g., an application server, web URLs, etc.). The platform 102 can also independently execute locally stored applications without RAN interaction. The platform 102 can include a GPS receiver 104 and a transceiver 106 operably coupled to an application specific integrated circuit (ASIC) 108, or other processor, microprocessor, logic circuit, or other data processing device. The ASIC 108 or other processor executes the application programming interface (API) 110 layer that interfaces with any resident programs in the memory 114 of the wireless device. The memory 114 can be comprised of read-only memory (ROM), random-access memory (RAM), electrically erasable programmable ROM (EEPROM), flash cards, or any memory common to computer platforms. The platform 102 can also include various sensors 112, such as an accelerometer, a gyroscope, a magnetometer, and/or the like. The platform 102 also can include a local database 116 that can store applications not actively used in memory 114, as well as other data. The local database 116 is typically a flash memory cell, but can be any secondary storage device as known in the art, such as magnetic media, EEPROM, optical media, tape, soft or hard disk, or the like.

Accordingly, an embodiment can include a UE, such as UE 100, that includes the ability to perform the functions described herein. As will be appreciated by those skilled in the art, the various logic elements can be embodied in discrete elements, software modules executed on a processor or any combination of software and hardware to achieve the functionality disclosed herein. For example, ASIC 108, memory 114, API 110, and local database 116 may all be used cooperatively to load, store and execute the various functions disclosed herein and thus the logic to perform these functions may be distributed over various elements. Alternatively, the functionality could be incorporated into one discrete component. Therefore, the features of the UE 100 in FIG. 1 are to be considered merely illustrative and the invention is not limited to the illustrated features or arrangement.

The wireless communication between the UE 100 and the RAN can be based on different technologies, such as code division multiple access (CDMA), wideband CDMA (W-CDMA), time division multiple access (TDMA), frequency division multiple access (FDMA), orthogonal frequency division multiplexing (OFDM), global system for mobile communications (GSM), or other protocols that may be used in a wireless communications network or a data communications network. As discussed in the foregoing and known in the art, voice transmission and/or data can be transmitted to the UE from the RAN using a variety of networks and configurations. Accordingly, the illustrations provided herein are not intended to limit the various embodiments and are merely to aid in the description of aspects of the various embodiments.

Modern cell phones, such as smart phones, are typically capable of determining their position within a certain degree of accuracy. When available, cell phones generally rely on global positioning system (GPS) signals. When GPS is not available, such as when the cell phone is indoors, or to improve the accuracy of the GPS position, the cell phone can use local positioning system (LPS) signals. In an LPS, the cell phone receives radio signals from at least three local transmitters, such as Wi-Fi transmitters, to triangulate its position. The cell phone may augment its GPS and/or LPS position with an internal inertial navigation system (INS). An INS uses the cell phone's accelerometers (motion) and gyroscopes (rotation) to continuously calculate the cell phone's position, orientation, and velocity via dead reckoning.

A cell phone may also execute a navigation application that guides a user from the current position of the cell phone to a specified destination. The navigation application uses the continuously determined position of the cell phone and a map of the area in which the cell phone is located to provide the user with turn-by-turn directions to the destination. The cell phone may display the entire route or just the area immediately around the cell phone's current position.

Since the display screen of a cell phone is small, the map from the cell phone's current position to the destination is often too small to read in detail, and the user must zoom-in to see the next path to follow. If a routable path to the destination is not available, the user needs to zoom-out to see the destination and to try to determine a route visually.

In some situations, it may be difficult and/or inconvenient for the user to continuously zoom-in and out on the map. Additionally or alternatively, the user may not want to take the time to enter a destination, or, even if the user enters a destination, turn-by-turn directions may not be available. For example, a user may have his or her hands full of luggage while trying to find a particular gate at an airport, and even if the user took the time to select that particular gate as a destination, turn-by-turn directions may not be available.

Accordingly, the various embodiments are directed to providing real-time direction indicators to nearby points of interest (POIs) or groups of POIs at a given location as the user moves through that location. The location can be an indoor or outdoor location, such as an airport, amusement park, shopping mall, theater, athletic stadium, office building, market district, nature preserve, zoo, etc.

In an embodiment, the user may open a map, or interactive virtual tour, of the location in the user interface (UI) of his or her UE. The map may be obtained as a download from a party affiliated with the location or a third party, or it may be preinstalled on the UE. The map may be two dimensional (2D) or three dimensional (3D), and may be as simplistic or realistic as the map provider makes it. The user may also have the option to toggle between these different view types of the map.

The map may come preloaded with a number of POIs, or the UE may download POI data for the location. A "point of interest" may be defined or identified by the map provider. For instance, if the location is an airport, the map provider may determine that gates, terminals, restaurants, shops, restrooms, information desks, car rental desks, baggage carousels, and the like, are points of interest. If the location is an amusement park, for example, the map provider may determine that rides, food stands, restrooms, picnic shelters, and the like, are points of interest. If the location is a zoo, as another example, then the map provider may determine that the various animal exhibits, food stands, restrooms, souvenir shops, and the like, are points of interest.

The POIs can be categorized and grouped by the map provider, or the POI data can include metadata describing the POI so that the UE can categorize and group the POIs in real time. For example, POIs at an airport can be categorized as "gates" and grouped as "gates in terminal A." When there are a large number of POIs, the UE can group POIs at a coarser level of granularity, and when there are fewer POIs, the UE can group the POIs at a finer level of granularity.

Once the UE obtains its position, using GPS signals, LPS signals, and/or its INS, as is known in the art, it determines the distance and path from its current position to the POIs or groups of POIs at the location. The path from the UE to the POI may comprise a number of stages, meaning that the user will have to make one more turns to reach the POI. The UE then displays a direction indicator to each of the POIs or groups of POIs. The direction indicator points in the direction of the first stage of the path to the POI. In that way, the user can follow a specific path to the POI, rather than simply be presented with an indication of the general direction to the POI.

The direction indicator may be an arrow or some other visual indicator that indicates the direction of the POI. For example, the indicator may be a blinking dot, an animated series of dashes, where dashes highlight sequentially from the user's position to the POI, an icon of a user moving towards the POI, or the like. The indicator may include information about the POI, such as the name, type, and/or distance from the user's current position. The indicators may show information that might be shown on physical signs, such as in an airport where arrows point to certain gates, except that the arrows are overlaid on the map. The indicators may also provide visual indications of the name, type, and/or relative distance using, for example, the color and/or size of the indicator. For example, a nearby POI may be indicated by a short thick arrow and a faraway POI by a long thin arrow.

If there are too many POIs for the UI to display indicators to all of them, the indicators may point to individual POIs that are close to the UE and to groups of POIs that are further away from the UE. A "close" POI may be one within a threshold distance from the UE's position. The threshold can be based on the number of POIs at the location and/or the size of the location. For example, a large location with a large number of POIs, such as an amusement park with a large number of rides, eateries, restrooms, etc. would have a lower threshold, such as, for example, 50 meters, than a small location with a few POIs, such as an office building with only a few conference rooms, offices, and a receptionist, which may have, for example, a threshold of 100 meters. The threshold may also, or alternatively, be based on the display attributes of the UE, such as display size and/or aspect ratio.

As the user approaches a coarse-grained group of POIs, the UE can refine the coarse grouping into a plurality of finer-grained groups. For example, the UE may combine gates at an airport within a threshold distance of each other, such as all the gates in a terminal, into one group. As the user approaches or enters the terminal, the UE can divide the large group into smaller groups, such as grouping the gates in the terminal based on the distance from the user, the gate number, which side of the terminal, and so on. In this way, when there are more POIs than can be comfortably displayed on the UE, the interface can point to groups of POIs, and as the user gets closer to the group, the UE can divide the group until the user is close enough that the UE can point to specific POIs within the group.

The UE displays indicators to POIs that are ahead or to the sides of the user, that is, are in the direction that the user is facing or travelling. The UE can determine its orientation, and thus the direction that the user is facing, based on its accelerometer and/or gyroscope. As the user's position changes, the direction of the indicators change, thereby indicating the paths to the POIs in real time. As the user passes a POI, the indicator pointing to the POI disappears, as it is evident that the user is not interested in that POI. The UE may display another indicator to another POI, so that the UE continues to display the same number of indicators. If the user turns, the indicators update to point to the POIs that are now ahead and to the sides of the user.

The UE can use hysteresis to prevent it from attempting to update the paths and/or display every time the user moves the UE, thereby conserving processing power. For example, the UE may wait a threshold period of time, such as one second, after the user starts moving in a particular direction before updating the paths and/or display. Additionally, when the user is turning, the UE can wait a threshold period of time, such as one second, after the user stops turning before updating the paths and/or display. In this way, a user can turn and hold the UE in a particular direction to see what POIs are in that direction, but turning to look at something while the user is walking will not cause the UE to update the display.

When the user arrives at a POI, as may be determined by the user remaining within a threshold distance of the POI for more than a threshold period of time, the UE may close the navigation application, switch it to a background mode, or continue running it until the user manually exits it. The UE may also provide additional information about the POI upon detecting that the user has arrived at the POI. For example, if the POI is a particular shop, the UE may open a web page about the shop in an Internet browser application.

The user can configure a number of features of the navigation application. The user can configure the maximum and/or minimum number of indicators to be displayed at any given time. For example, the user may set a minimum number of indicators to "2" and a maximum number of indicators to "8." The UE will then display anywhere from two to eight indicators, depending on the number of POIs, groups of POIs, distances to POIs, etc.

The user can also configure how the indicators display information about a POI. For example, the user can configure the indicators to display the name and type of a POI or a group of POIs and the distance to the POI or group of POIs. The user can configure the indicators to display this information using text, color, size, etc., of the indicator. The user can also configure the units of measurement to use to express distance, such as feet, yards, meters, etc.

The user can also configure the types of POIs for which to show indicators. For example, at an airport, the user can configure the UE to display indicators for restrooms, coffee shops, and gates, but not car rental centers or information desks.

The user can also configure what the UE should do upon arriving at a POI. For example, the user can configure the UE to exit the navigation application, switch it to a background mode, open a web page about the POI, etc. There are many features of the navigation application that may be configured by a user, and the various embodiments are not limited to the configurations listed here.

The user can also manipulate the indicators or groups of indicators. For example, touching an indicator may cause the display of a menu that allows the user to edit the display attributes for that indicator or corresponding POI, such as color, width, font, etc. The user may be able to modify the groupings, such as adding a POI to another group, removing a POI from a group, and the like. The user may also be able to delete the indicator or POI, or delete one or more of a group of indicators or POIs.

In an embodiment, instead of, or in addition to, the visual indicators, the UE may provide audible indicators that indicate at least the direction and distance to one or more POIs. For example, the UE may play the indicator: "Restrooms straight ahead 20 meters." The UE may play audible indicators for multiple POIs, then a period of time later, play audible indicators for the POIs based on the user's new position. For example, the UE may play the indicators: "Restrooms straight ahead 20 meters, gates 1-10 straight ahead 30 meters," then a few seconds later, "Restrooms straight ahead 15 meters, gates 1-10 straight ahead 25 meters."

In this audible mode, the UE may limit the number of POIs or groups of POIs so that the user is not overwhelmed by the number of audible indicators. The UE may provide a voice command interface to permit the user to configure the navigation application as discussed above.

Figure 2B:
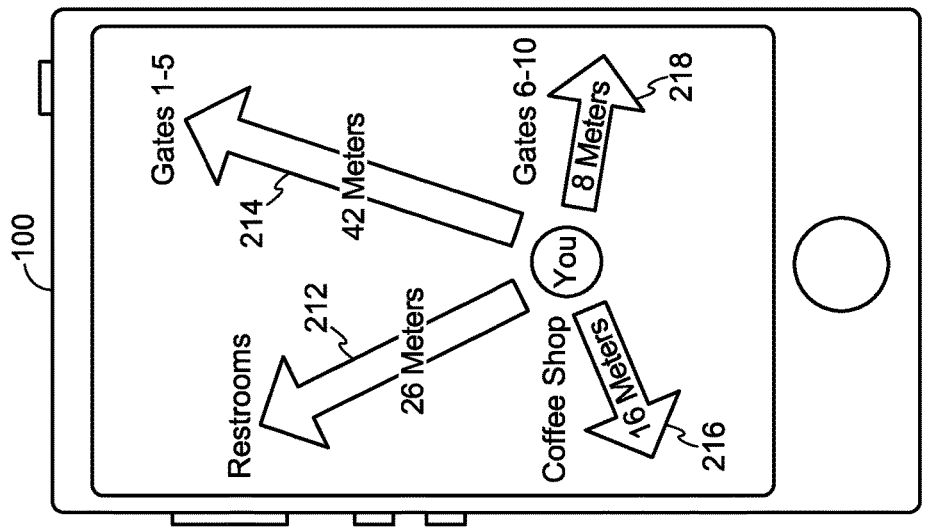
FIG. 2B illustrates an exemplary screenshot of a UE at a later point in time than the exemplary screenshot illustrated in FIG. 2A.
Figure 2A:
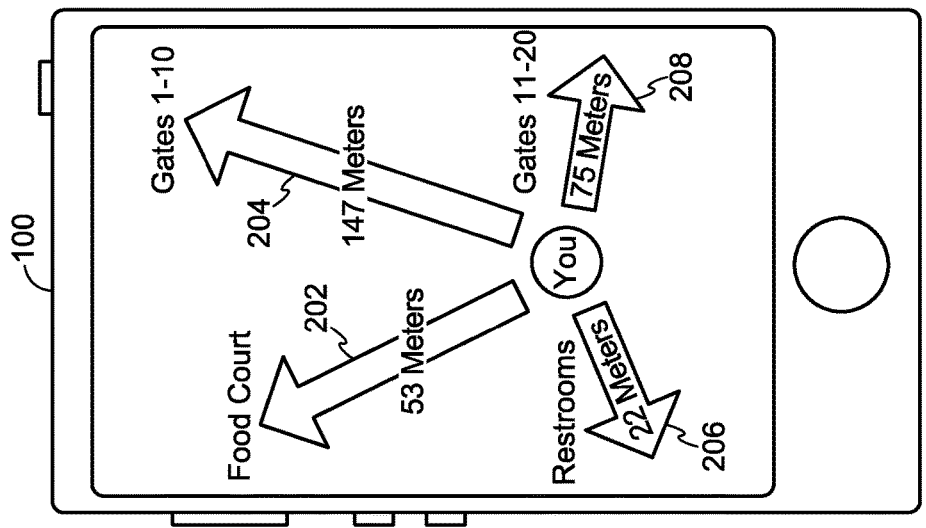
FIG. 2A illustrates an exemplary screenshot of a UE running the navigation application according to an embodiment in an airport.

FIG. 2A illustrates an exemplary screenshot of a UE, such as UE 100, running the navigation application in an airport. In FIG. 2A, the user's position is indicated by a circle and the POI indicators are arrows. Each arrow shows the distance to the POI, and a text label associated with the arrow shows the type of the POI. For instance, indicator 202 indicates that the food court is 53 meters ahead and to the left of the user. The "food court" is a group of POIs that have been combined and labeled "food court" based on the fact that they are all restaurants of some sort in close proximity to each other. Alternatively, the map provider may have grouped the POIs into the "food court" group and given it that name.

Indicator 204 indicates that gates 1-10 are 147 meters ahead and to the right of the user. Like the "food court" group, "gates 1-10" is a group of ten POIs (where each gate is a POI) that have been combined and labeled "gates 1-10" based on the proximity of the gates to each other. In the same way, indicator 208 indicates that gates 11-20 are 75 meters to the right of the user.

Indicator 206 indicates that a set of restrooms is 22 meters to the left of the user. "Restrooms" is an example of an individual POI, rather than a group POI, as men's and women's restrooms are typically located close to each other. In an alternative embodiment, however, the men's and women's restrooms can be separate POIs.

FIG. 2B illustrates an exemplary screenshot of UE 100 at a later point in time than the exemplary screenshot illustrated in FIG. 2A. In FIG. 2B, as in FIG. 2A, the user's position is indicated by a circle and the POI indicators are arrows. In FIG. 2B, the user has approached gates 1-10 and is now close enough that the UE has broken the coarse-grained group "gates 1-10" into two finer-grained groups, "gates 1-5" and "gates 6-10." Accordingly, indicator 214 indicates that gates 1-5 are 42 meters ahead and to the right of the user and indicator 218 indicates that gates 6-10 are 8 meters to the right of the user.

Indicator 212 indicates that a set of restrooms is 26 meters ahead of the user on the left. This is a different set of restrooms than the restrooms pointed to by indicator 206 in FIG. 2A. Indicator 216 indicates that a coffee shop is 16 meters to the left. This coffee shop is probably not in the "food court" group of POIs pointed to by indicator 202, although it could be, as the user has traveled 105 meters from the example screenshot shown in FIG. 2A.

In FIG. 2A, three of the four indicators point to groups of POIs, i.e. the "food court," "gates 1-10," and "gates 11-20."

In FIG. 2B, only two of the four indicators point to groups of POIs, i.e. "gates 1-5" and "gates 6-10." This is because in FIG. 2B the user is now close enough to the POIs and/or there are few enough POIs ahead of the user that the UE does not need to group as many of the POIs.

Figure 3:
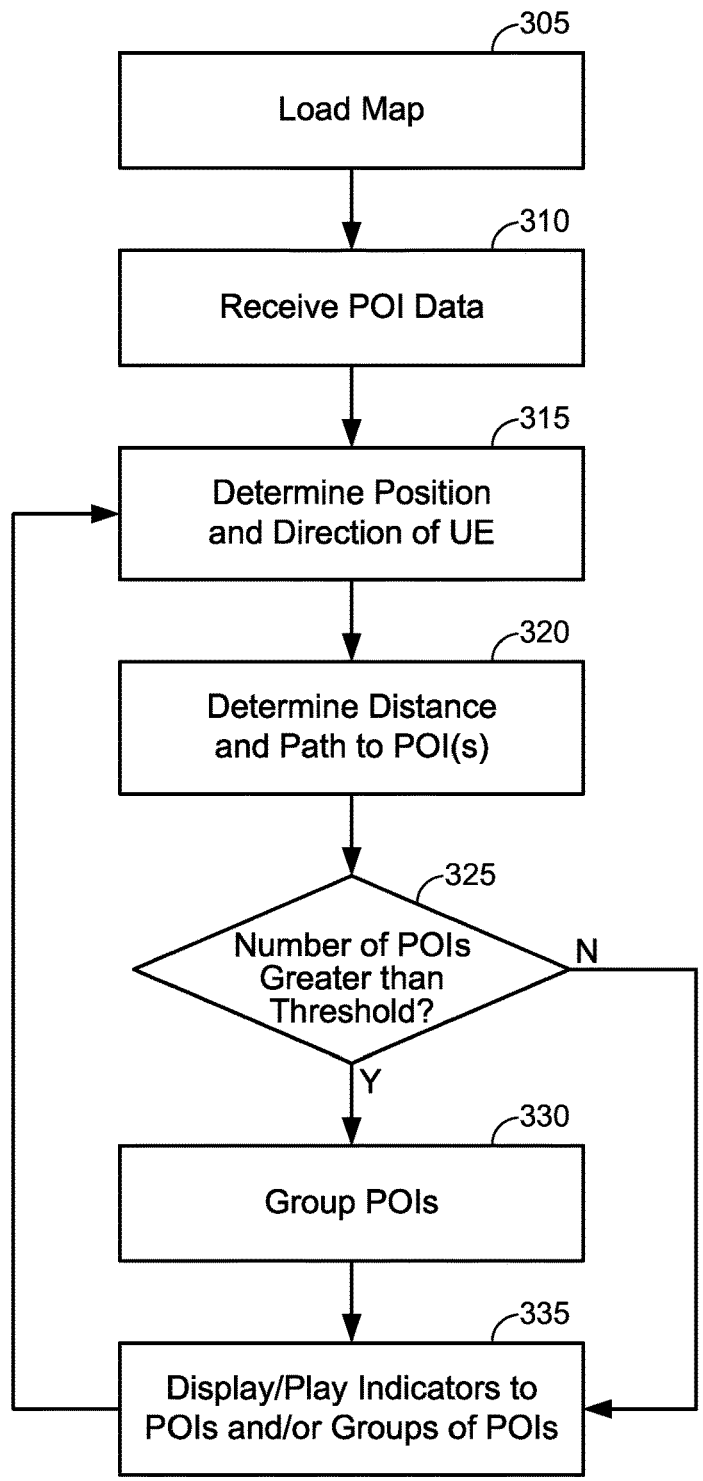
FIG. 3 illustrates an exemplary flow of an embodiment performed at a UE.

FIG. 3 illustrates an exemplary flow of an embodiment performed at a UE, such as UE 100. At 305, the UE 100 loads a map of a given location. For example, an application running on the UE 100 may load the map from a local database, such as local database 116, into a working memory, such as memory 114. Alternatively, the UE 100 may download the map from a remote server over a wired or wireless connection. As discussed above, the location may be an airport, an amusement park, a shopping mall, a theater, an athletic stadium, an office building, and the like. The UE 100 may detect that it is in such a location and determine whether or not a map of that location is stored in its memory or available to download.

At 310, the UE 100 receives POI data. The UE 100 may load this data from local memory or download it. The POI data may be included with the map data or as a separate download. At 315, the UE 100 determines its position and direction. As discussed above, the UE may determine its position using GPS signals and/or LPS signals, and may determine its direction using integrated accelerometers and gyroscopes.

At 320, the UE 100 determines the distances and directions to the POI(s). At 325, the UE 100 determines whether the number of POIs is greater than a threshold. The number of POIs may be all the POIs available for the location, or just POIs of the type specified by the user and to which the user wishes to receive directions. As discussed above, the threshold is based on the size of the location and the number of POIs.

If the number of POIs is greater than the threshold, then at 330, the UE 100 groups the POIs into one or more groups. The groupings may be based on the user's preferences, the proximity of the POIs to each other and/or the UE, the types of POIs available, etc.

At 335, if the number of POIs is not greater than the threshold, or after grouping the POIs at 330, the UE 100 displays or plays a plurality of indicators to the POIs and/or groups of POIs. The indicators show at least the direction to and name of the POIs, and may also show the distance and/or other information. In order to continuously, or at least periodically, update the POI indicators, the flow returns to 315.

Figure 4:
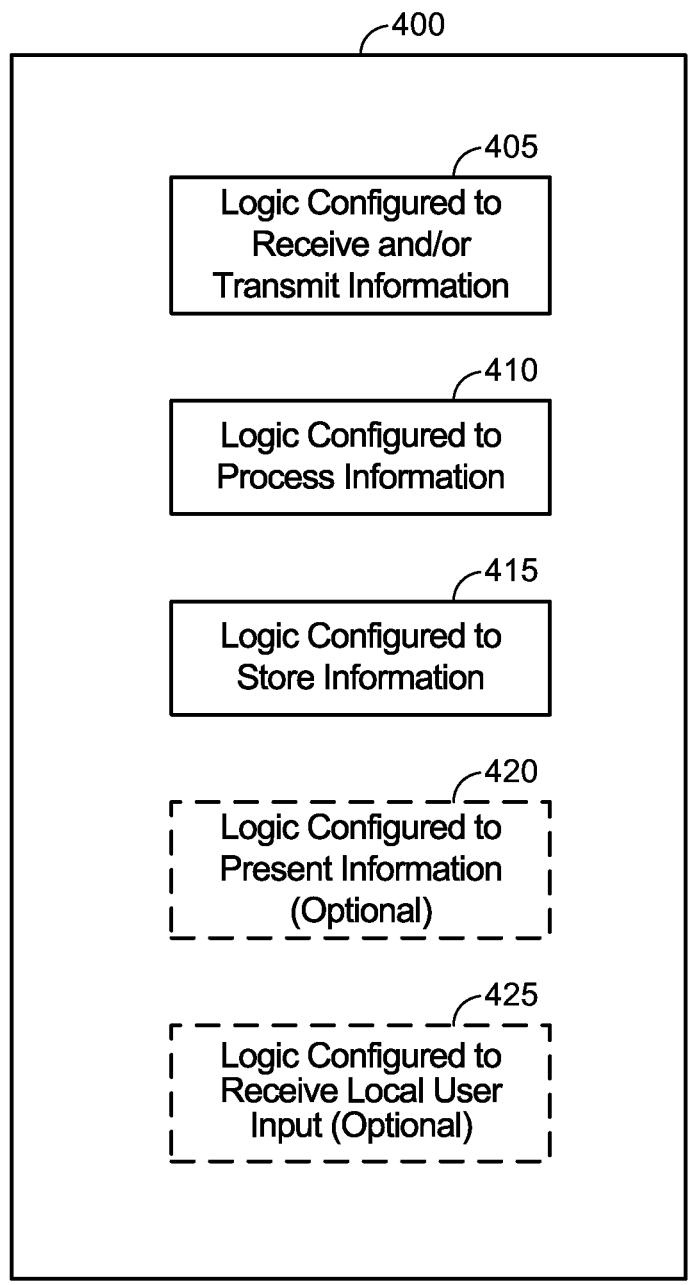
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UE 100.

Referring to FIG. 4, the communication device 400 includes logic configured to receive and/or transmit information 405. In an example, if the communication device 400 corresponds to a wireless communications device (e.g., UE 100), the logic configured to receive and/or transmit information 405 can include a wireless communications interface (e.g., Bluetooth, WiFi, 2G, CDMA, W-CDMA, 3G, 4G, LTE, GPS, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). In a further example, the logic configured to receive and/or transmit information 405 can include sensory or measurement hardware by which the communication device 400 can monitor its local environment (e.g., an accelerometer, a gyroscope, a temperature sensor, a light sensor, an antenna for monitoring local RF signals, etc.). The logic configured to receive and/or transmit information 405 can include logic configured to determine a position and direction of the communication device 400. The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the logic configured to process information 410 can include logic configured to determine a position and direction of the communication device 400 and/or logic configured to determine one or more paths from the communication device 400 to one or more destinations associated with a current location of the communication device 400. The processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 100 as shown in FIG. 1, the logic configured to present information 420 can include the touchscreen display 105 of UE 100. The logic configured to present information 420 can also include logic configured to display one or more direction indicators corresponding to one or more paths to one or more destinations. The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 100 as shown in FIG. 1, the logic configured to receive local user input 425 can include any of the buttons 115 or 110 through 125, the touchscreen display 105, etc. The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will be clear to one of ordinary skill in the art from a review of the embodiments described above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for navigating based on directionality, comprising:
   determining a position of a mobile device and a current location of the mobile device based on the position;
   identifying a first plurality of destinations associated with the current location of the mobile device;
   identifying a destination type of each of the first plurality of destinations;
   determining that a number of the first plurality of destinations is greater than a threshold;
   in response to the determination that the number of the first plurality of destinations is greater than the threshold, combining each of the first plurality of destinations having the same destination type into a destination group, wherein the destination group is represented as a single combined destination;
   determining a path from the mobile device to the destination group;
   displaying, at the mobile device, a single representation of the destination group;
   displaying, at the mobile device, the path to the destination group
   determining that the mobile device is within a threshold distance of the destination group;
   in response to the determination that the mobile device is within the threshold distance of the destination group, dividing the destination group into a second plurality of destinations; and
   displaying, at the mobile device, a separate representation of each of the second plurality of destinations.

2. The method of claim 1, wherein the determining the position of the mobile device is based, at least in part, on global positioning system (GPS) signals, local positioning system (LPS) signals, sensors integrated into the mobile device, or any combination thereof.

3. The method of claim 1, further comprising:
   displaying, at the mobile device, a direction indicator corresponding to the path to the destination group.

4. The method of claim 3, further comprising:
   determining a distance along the path from the mobile device to the destination group.

5. The method of claim 4, wherein the direction indicator includes an indication of the distance from the mobile device to the destination group.

6. The method of claim 3, further comprising:
   updating the path, the destination group, or the direction indicator based on movement of the mobile device.

7. The method of claim 3, wherein a user is enabled to edit the direction indicator.

8. The method of claim 7, wherein the editing comprises changing an attribute of the direction indicator.

9. The method of claim 8, wherein the changing the attribute comprises grouping the direction indicator with at least one other direction indicator, ungrouping the direction indicator from a group of direction indicators, or deleting the direction indicator.

10. The method of claim 1, wherein the current location is one of an airport, an amusement park, a shopping mall, a theater, an athletic stadium, a zoo, a park, or an office building.

11. The method of claim 10, wherein the first plurality of destinations comprises a plurality of gates in the airport.

12. The method of claim 1, wherein the first plurality of destinations comprises points of interest within the current location.

13. The method of claim 1, further comprising:
    playing one or more audible direction indicators corresponding to the path to the destination group.

14. The method of claim 1, further comprising:
    detecting an arrival of the mobile device at a destination of the second plurality of destinations.

15. The method of claim 14, further comprising:
in response to the detecting, performing one or more of:
closing an application providing navigation to the destination group,
switching the application to a background mode, or
providing information about the destination.

16. The method of claim 1, wherein the first plurality of destinations comprises at least one individual destination and at least one smaller destination group, a plurality of individual destinations, or a plurality of smaller destination groups.

17. The method of claim 1, wherein the second plurality of destinations comprises at least one individual destination and at least one smaller destination group, a plurality of individual destinations, or a plurality of smaller destination groups.

18. The method of claim 1, wherein the method is performed by a server remote from the mobile device.

19. The method of claim 18, wherein the displaying the single representation of the destination group, the displaying the path to the destination group, and the displaying the separate representation of each of the second plurality of destinations comprises the server instructing the mobile device to display the single representation of the destination group, display the path to the destination group, and display the separate representation of each of the second plurality of destinations.

20. The method of claim 1, wherein the method is performed by the mobile device.

21. An apparatus for navigating based on directionality, comprising:
at least one processor configured to:
determine a position of a mobile device and a current location of the mobile device based on the position;
identify a first plurality of destinations associated with the current location of the mobile device;
identify a destination type of each of the first plurality of destinations;
determine that a number of the first plurality of destinations is greater than a threshold;
combine, in response to the determination that the number of the first plurality of destinations is greater than the threshold, each of the first plurality of destinations having the same destination type into a destination group, wherein the destination group is represented as a single combined destination;
determine a path from the mobile device to the destination group;
display, at the mobile device, a single representation of the destination group;
display, at the mobile device, the path to the destination group;
determine that the mobile device is within a threshold distance of the destination group;
divide, in response to the determination that the mobile device is within the threshold distance of the destination group, the destination group into a second plurality of destinations; and
display, at the mobile device, a separate representation of each of the second plurality of destinations.

22. The apparatus of claim 21, wherein the at least one processor is further configured to:
display, at the mobile device, a direction indicator corresponding to the path to the destination group.

23. The apparatus of claim 22, wherein the at least one processor is further configured to:
determine a distance along the path from the mobile device to the destination group.

24. The apparatus of claim 23, wherein the direction indicator includes an indication of the distance from the mobile device to the destination group.

25. The apparatus of claim 22, wherein a user is enabled to edit the direction indicator.

26. The apparatus of claim 25, wherein the editing comprises grouping the direction indicator with at least one other direction indicator, ungrouping the direction indicator from a group of direction indicators, or deleting the direction indicator.

27. The apparatus of claim 21, wherein the first plurality of destinations comprises points of interest within the current location.

28. The apparatus of claim 21, wherein the at least one processor is further configured to:
perform, in response to detecting an arrival of the mobile device at a destination of the second plurality of destinations, one or more of:
close an application providing navigation to the destination group,
switch the application to a background mode, or
provide information about the destination.

29. A non-transitory computer-readable medium storing computer-executable instructions for navigating based on directionality, the computer-executable instructions comprising:
at least one instruction for determining a position of a mobile device and a current location of the mobile device based on the position;
at least one instruction for identifying a first plurality of destinations associated with the current location of the mobile device;
at least one instruction for identifying a destination type of each of the first plurality of destinations;
at least one instruction for determining that a number of the first plurality of destinations is greater than a threshold;
at least one instruction for combining, in response to the determination that the number of the first plurality of destinations is greater than the threshold, each of the first plurality of destinations having the same destination type into a destination group, wherein the destination group is represented as a single combined destination;
at least one instruction for determining a path from the mobile device to the destination group;
at least one instruction for displaying, at the mobile device, a single representation of the destination group;
at least one instruction for displaying, at the mobile device, the path to the destination group;
at least one instruction for determining that the mobile device is within a threshold distance of the destination group;
at least one instruction for dividing, in response to the determination that the mobile device is within the threshold distance of the destination group, the destination group into a second plurality of destinations; and
at least one instruction for displaying, at the mobile device, a separate representation of each of the second plurality of destinations.

30. An apparatus for navigating based on directionality, comprising:
means for processing configured to:
determine a position of a mobile device and a current location of the mobile device based on the position;

identify a first plurality of destinations associated with the current location of the mobile device;

identify a destination type of each of the first plurality of destinations;

determine that a number of the first plurality of destinations is greater than a threshold;

combine, in response to the determination that the number of the first plurality of destinations is greater than the threshold, each of the first plurality of destinations having the same destination type into a destination group, wherein the destination group is represented as a single combined destination;

determine a path from the mobile device to the destination group;

display, at the mobile device, a single representation of the destination group;

display, at the mobile device, the path to the destination group;

determine that the mobile device is within a threshold distance of the destination group;

divide, in response to the determination that the mobile device is within the threshold distance of the destination group, the destination group into a second plurality of destinations; and display, at the mobile device, a separate representation of each of the second plurality of destinations.

\* \* \* \* \*